Patented July 8, 1924.

1,500,265

UNITED STATES PATENT OFFICE.

JOSEPH E. PLUMSTEAD, OF WILMINGTON, DELAWARE, ASSIGNOR TO THE JESSUP & MOORE PAPER CO., OF PHILADELPHIA, PENNSYLVANIA, A CORPORATION OF MASSACHUSETTS.

METHOD OF EXTRACTING LIQUID FROM POROUS MATERIAL CONTAINING THE SAME.

No Drawing.   Application filed November 2, 1922.   Serial No. 598,697.

*To all whom it may concern:*

Be it known that I, JOSEPH E. PLUMSTEAD, a citizen of the United States, and resident of Wilmington, in the county of New Castle and State of Delaware, have invented certain new and useful Improvements in a Method of Extracting Liquid from Porous Material Containing the Same, of which the following is a specification.

My present invention relates to the treatment of materials containing liquid, and more particularly to that class of materials which are porous and friable, such as coke, pumice, charcoal, and the like, which, by capillary attraction and absorption tend to take up a liquid menstruum when the said porous material is suspended, or mixed with such a liquid.

This invention concerns a particular method of separating the liquid menstruum from the solid matter in a manner more efficient than has heretofore been possible.

It is a well-known fact that when a sludge of porous material has been drained as dry as possible, even with the aid of a vacuum filter, the moisture content runs on occasion to as high as 75 to 80%. This moisture content is not apparent upon casual examination, but a quantitative determination of the solid and liquid constituents will prove the above to be true. The apparent reason for this phenomena is that each minute mass of the material is composed of cells which when exposed to physical contact with the liquid mentruum, take up a quantity by capillary attraction or absorption, until the cells are filled. The amount of liquid contained in each of these cells is apparently more than enough to support the cell walls in suspension, provided these walls are sufficiently comminuted, or brought to the minute state where suspension is physically possible. The amount of liquid contained within each cell is so minute that gravity does not have sufficient force to remove it from the cell, neither can this be accomplished by aid of a vacuum filter, or the like. It is, therefore, necessary that these cell walls be ruptured and theoretically reduced to a state where the mass particles are in such a comminuted state that the existence of a cell is impossible. Thus each cell may be compared to a thin-walled glass ball filled with water. If this glass ball is broken and the walls reduced to a fine state of division, the water within the ball will be found to be far in excess of the amount required to carry this glass dust in liquid suspension, and the liquid thus set free may be removed.

To this end, I have found that where a mass is composed of porous friable material, from which the larger portion of the water may not be removed through ordinary methods, this water may be to a large extent, readily removed upon breaking down the cell walls or partitions, such as by crushing, grinding, or otherwise comminuting the individual particles. This liquid which is made available by the above process, may now be removed either by filtering, settling, or decanting, as circumstances will best determine.

Specifically, I have discovered that a carbon sludge resulting from the reclamation of soda pulp black liquor which comprises very fine particles of carbon in an aqueous vehicle, may be dried by means of a vacuum filter to the point where the liquid constituent is reduced to approximately 80%. Further separation of the moisture from the solid matter is extremely difficult by mechanical means, and can only be accomplished by application of heat, which is necessarily expensive and slow. At this point the mass has the physical appearance of a damp powder, but due to the lightness of the solid material, the entire weight is largely moisture. If now this mass is subjected to comminution, and the cell structure disrupted, I am able to remove 50% of the moisture contained therein, or, in other words, reduce the moisture content to $66\frac{2}{3}\%$. Where the carbon is desired in its dried form, the removal of this moisture in such a manner, will be found to entail a tremendous saving, where heretofore the moisture has been removed by heat this dried material may now be used for fuel.

Favorable results may be likewise secured by carrying out the above process upon any porous material where it is desired to secure the solid matter in dry or nearly dry state, and it has been found that upon such treatment, the liquid content set free from the cells is sufficient to carry the solids in liquid suspension without further addition of liquid, and the mass may be readily pumped, or otherwise easily handled to the point of utilization, or to the point of further treatment, where the solid and liquid materials may be separated, as stated above.

What I claim is:—

A method of preparing pulverized fuel, which includes the step of subjecting a moist carbon sludge resulting from the reclamation of soda pulp black liquor, to a grinding action, thereby overcoming the cohesion between the carbon masses and carbon particles, and separating each from its neighbor to free mechanically held water, and separating said water from said carbon.

In testimony whereof I affix my signature.

JOSEPH E. PLUMSTEAD.